US011403700B2

(12) United States Patent
Shah et al.

(10) Patent No.: US 11,403,700 B2
(45) Date of Patent: Aug. 2, 2022

(54) LINK PREDICTION USING HEBBIAN GRAPH EMBEDDINGS

(71) Applicant: Target Brands, Inc., Minneapolis, MN (US)

(72) Inventors: Shalin Shah, Sunnyvale, CA (US); Venkataramana Bantwal Kini, Sunnyvale, CA (US)

(73) Assignee: Target Brands, Inc., Minneapolis, MN (US)

( * ) Notice: Subject to any disclaimer, the term of this patent is extended or adjusted under 35 U.S.C. 154(b) by 328 days.

(21) Appl. No.: 16/855,761

(22) Filed: Apr. 22, 2020

(65) Prior Publication Data

US 2020/0342523 A1 Oct. 29, 2020

Related U.S. Application Data

(60) Provisional application No. 62/837,601, filed on Apr. 23, 2019.

(51) Int. Cl.
*G06F 16/00* (2019.01)
*G06Q 30/06* (2012.01)
(Continued)

(52) U.S. Cl.
CPC ..... *G06Q 30/0643* (2013.01); *G06F 16/9024* (2019.01); *G06F 17/18* (2013.01); *G06N 20/00* (2019.01)

(58) Field of Classification Search
CPC . G06Q 30/0643; G06F 16/9024; G06F 17/18; G06F 16/9566; G06N 20/00; G06N 5/003; G06N 7/005
See application file for complete search history.

(56) References Cited

U.S. PATENT DOCUMENTS 11,184,301 B2 * 11/2021 Menon .................... H04L 51/02
11,263,753 B2 * 3/2022 Larlus-Larrondo ....... G06T 7/73
(Continued)

OTHER PUBLICATIONS

Zhang et al., Link Prediction Based on Graph Neural Networks, 32nd Conference on Neural Information Processing Systems (NeurIPS 2018); 11 Pages.

(Continued)

*Primary Examiner* — Noosha Arjomandi
(74) *Attorney, Agent, or Firm* — Merchant & Gould P.C.

(57) ABSTRACT

Methods and systems for generating link predictions are provided. In one aspect, a method includes initializing a graph including a plurality of nodes representing selections of items in a training dataset to a multivariate normal distribution having a predetermined mean and a predetermined initial variance, the items in the training dataset comprising items in an item collection. The method includes, for each node in the graph, modeling embeddings for the node as embeddings of each neighboring node having a shared edge, with each being updated based at least in part on a transition probability and a variance. A predetermined number of iterations of updating are executed each iteration including an updated variance based on a learning rate. Based on receipt of an identification of an item from among the item collection, a plurality of predicted selections of items are identified using the embeddings for a node corresponding to the item.

20 Claims, 8 Drawing Sheets

(51) Int. Cl.
*G06F 17/18* (2006.01)
*G06F 16/901* (2019.01)
*G06N 20/00* (2019.01)

(56) References Cited

U.S. PATENT DOCUMENTS

2010/0121792 A1 5/2010 Yang et al.
2016/0026918 A1* 1/2016 Barbieri ............. G06Q 30/0277 706/11
2017/0188101 A1* 6/2017 Srinivasaraghavan ...................... H04L 67/10
2018/0247224 A1* 8/2018 Garcia Duran ........ G16H 50/20
2019/0122111 A1* 4/2019 Min ..................... G06N 3/0427
2019/0188326 A1* 6/2019 Daianu .................... G06N 3/08
2019/0205393 A1* 7/2019 Wang ................... G06N 3/0454
2019/0354689 A1 11/2019 Li et al.
2020/0126669 A1* 4/2020 Nuernberg ............. G16H 50/20
2020/0311186 A1* 10/2020 Wang ....................... G06N 3/08
2020/0342523 A1* 10/2020 Shah ................... G06F 16/9566
2020/0394413 A1* 12/2020 Bhanu .................. A63B 69/002
2021/0133483 A1* 5/2021 Prabhu ................. G06K 9/6262
2022/0067030 A1* 3/2022 Jiao .......................... G06N 5/02
2022/0083778 A1* 3/2022 Liu ........................ G06N 7/005

OTHER PUBLICATIONS

Nickel et al., Poincaré Embeddings for Learning Hierarchical Representations, , 31st Conference on Neural Information Processing Systems (NIPS 2017); 10 Pages.
Tong, Flawnson, Graph Embedding for Deep Learning, Graph Embedding for Deep Learing—Toward Data Science, Dated: Dec. 19, 2019; 13 Pages.
Cai et al., A Comprehensive Survey of Graph Embedding: Problems, Techniques and Applications, IEEE Transactions of Knowledge and Data Engineering, vol. XX, No. XX, Sep. 2017.
Chamberlain et al., Scalable Hyperbolic Recommender Systems, ACM ISBN; 2019; 11 Pages.
Schmeier et al., Music Recommendations in Hyperbolic Space: An Application of Empirical Bayes and Hierarchical Poincaré Embeddings, ACM ISBN; 2019; 5 Pages.
Jain, Implementing Poincaré Embeddings, RARE Technologies, Supported by the National Institutes of Health, Dec. 2017; 18 Pages.

* cited by examiner

| Algorithm | Dimensionality | AstroPh | BlogCatalog | HepTh |
|---|---|---|---|---|
| Hebbian Graph Embeddings | 200 | 0.573 | 0.499 | 0.619 |
| node2vec | 256 | 0.56 | 0.24 | 0.42 |
| GF | 256 | 0.29 | 0.09 | 0.39 |
| SDNE | 256 | 0.46 | 0.33 | 0.5 |
| HOPE | 256 | 0.33 | 0.45 | 0.32 |
| LE | 256 | 0.26 | 0.09 | 0.4 |

| DataSet | Nodes | Edges | Reconstruction Results of Varying Dimensionality | | | | | | | |
|---|---|---|---|---|---|---|---|---|---|---|
| | | | 10 | 20 | 50 | 100 | 200 | 300 | 400 | 500 |
| CondMat | 23,133 | 93,497 | 0.192 | 0.304 | 0.495 | 0.649 | 0.778 | 0.838 | 0.873 | 0.895 |
| GrQc | 5,242 | 14,496 | 0.245 | 0.407 | 0.625 | 0.763 | 0.860 | 0.894 | 0.910 | 0.918 |
| HepPh | 12,008 | 118,521 | 0.196 | 0.293 | 0.455 | 0.586 | 0.698 | 0.755 | 0.789 | 0.814 |
| AstroPh | 18,772 | 198,110 | 0.181 | 0.245 | 0.362 | 0.461 | 0.573 | 0.635 | 0.675 | 0.707 |
| HepTh | 27,770 | 352,807 | 0.188 | 0.261 | 0.402 | 0.509 | 0.619 | 0.679 | 0.709 | 0.732 |
| BlogCatalog | 10,312 | 333,983 | 0.432 | 0.432 | 0.458 | 0.491 | 0.499 | 0.507 | 0.508 | 0.496 |

| DataSet | Nodes | Edges | Random (no training) |
|---|---|---|---|
| | | | 500 (Dimension) |
| CondMat | 23,133 | 93,497 | 0.0139 |
| GrQc | 5,242 | 14,496 | 0.0126 |
| HepPh | 12,008 | 118,521 | 0.0233 |
| AstroPh | 18,772 | 198,110 | 0.0255 |
| HepTh | 27,770 | 352,807 | 0.0292 |
| BlogCatalog | 10,312 | 333,983 | 0.0364 |

| | Iterations | Learning Rate | Dimensionality | Hit Rate @10 |
|---|---|---|---|---|
| Hebbian Graph Embeddings | 10 | 1.0 | 100 | **24.2%** |
| | 10 | 1.0 | 200 | **30.1%** |
| | 10 | 1.0 | 250 | **31.1%** |

| Algorithm | Dimensionality | AstroPh | BlogCatalog | HepTh |
|---|---|---|---|---|
| Hebbian Graph Embeddings | 200 | 0.317 | 0.202 | 0.339 |
| node2vec | 256 | 0.025 | 0.17 | 0.04 |
| GF | 256 | 0.15 | 0.02 | 0.17 |
| SDNE | 256 | 0.24 | 0.19 | 0.16 |
| HOPE | 256 | 0.25 | 0.07 | 0.17 |
| LE | 256 | 0.21 | 0.04 | 0.23 |

LINK PREDICTION USING HEBBIAN GRAPH EMBEDDINGS

CROSS-REFERENCE TO RELATED APPLICATIONS

The present application claims priority from U.S. Provisional Patent Application No. 62/837,601, filed in Apr. 23, 2019, the disclosure of which is hereby incorporated by reference in its entirety.

BACKGROUND

Graph embeddings learn vector representations of nodes in a graph. Such graph embeddings exploit the locality structure of a graph and generate embeddings for nodes which could be words in a language, products of a retail website; and the nodes are connected based on a context window. The advantage of learning low dimensional embeddings is that they induce an order on the nodes of a graph—for example, authors in a citation network, products in a recommender system, or words in a text corpus. The order could be established using an inner product or using another machine learning algorithm like a neural network or a random forest. Example algorithms that provide such analysis include, e.g., node2vec or deep convolutional embeddings. However, existing algorithms have drawbacks, particularly when applied in contexts such as link prediction and/or graph reconstruction.

For example, in the applied context of link prediction (e.g., predicting a particular link that will be selected by an online user, given past user behavior), existing approaches do not provide significantly advantageous performance, particularly as dimensionality of the embeddings increases. Accordingly, other approaches for learning hierarchical representations are desired, particularly as applied to prediction systems.

SUMMARY

In accordance with the following disclosure, the above and other issues are addressed by the following.

In a first aspect, a method includes initializing a graph including a plurality of nodes representing selections of items in a training dataset to a multivariate normal distribution having a predetermined mean and a predetermined initial variance, the items in the training dataset comprising items in an item collection. The method further includes, for each node in the graph, modeling embeddings for the node as a non-convex Gaussian mixture of embeddings of each neighboring node having a shared edge with the node, the embeddings being updated based at least in part on a transition probability and a variance. The method also includes updating the embeddings for each node over a predetermined number of iterations, each iteration including an updated variance based on a learning rate. The method includes, based on receipt of an identification of an item from among the item collection, identifying a plurality of predicted selections of items using the embeddings for a node corresponding to the item.

In a second aspect, an online link prediction system is disclosed. The online link prediction system includes a processor and a memory operatively connected to the processor. The memory stores instructions which, when executed by the processor, cause the system to perform: initializing a graph including a plurality of nodes representing selections of items in a training dataset to a multivariate normal distribution having a predetermined mean and a predetermined variance, the items in the training dataset comprising items in an item collection; for each node in the graph, modeling embeddings for the node as a non-convex Gaussian mixture of embeddings of each neighboring node having a shared edge with the node, the embeddings being updated based at least in part on a transition probability and a variance; updating the embeddings for each node over a predetermined number of iterations, each iteration including an updated variance based on a learning rate; and based on receipt of an identification of an item from among the item collection, identifying a plurality of predicted selections of items using the embeddings for a node corresponding to the item.

In a third aspect, a system includes a retail web server, and an online link prediction system communicatively coupled to the retail web server. The online link prediction system is configured to initialize a graph including a plurality of nodes representing selections of items in a training dataset to a multivariate normal distribution having a predetermined mean and a predetermined variance, the items in the training dataset comprising items in an item collection. The system is further configured to, for each node in the graph, model embeddings for the node as a non-convex Gaussian mixture of embeddings of each neighboring node having a shared edge with the node, the embeddings being updated based at least in part on a transition probability and a variance, and update the embeddings for each node over a predetermined number of iterations, each iteration including an updated variance based on a learning rate. The online link prediction system is further configured to, based on receipt of an identification of an item from among the item collection, identify a plurality of predicted selections of items using the embeddings for a node corresponding to the item.

BRIEF DESCRIPTION OF THE DRAWINGS

FIG. 4 is a chart illustrating Mean Average Precision results for network embeddings for Link Prediction using a set of publicly available datasets.

FIG. 5 illustrates a chart of example results for reconstruction of an original graph on publicly available datasets.

FIG. 6 is a chart illustrating random Mean Average Precision results (without training) for the reconstruction of FIG. 5 in an untrained environment.

FIG. 8 is a chart illustrating a link prediction hit rate using the Hebbian graph embeddings process described herein.

FIG. 9 illustrates a comparison between the Hebbian graph embeddings of the present disclosure with alternative illustrative algorithms on three selected datasets, in an example implementation.

DETAILED DESCRIPTION

As briefly described above, embodiments of the present invention are directed to a link prediction system that applies a specific learning model to graph embeddings. In particular, a Hebbian learning model is applied to graph embeddings. In example embodiments, a parameter update rule is applied which is based on a strength of connection between two nodes, as applied to neural networks. As applied to graph embeddings, based on a pre-computed strength of connection between two nodes of a graph (e.g., a product graph), a set of parameters (the embeddings of a particular node) may be iteratively updated based on an error-free associative learning rule. Because nodes that are contextually connected with each other have similar embeddings, such node similarity can be detected.

In example methods and systems, associative learning along with the principle of triadic closure (which can be generalized to more than three nodes) can be implemented to learn the embeddings. In accordance with such methods and systems, embeddings from both algorithms to the task of recommending items to users based on nearest neighbors based on the inner product of the embeddings.

In a specific embodiment, graph embeddings with an error-free associative learning update rule are used. The error-free associative learning update rule models the embedding vector of a given node as a non-convex Gaussian mixture of the embeddings of the nodes in its immediate vicinity with some constant variance that is reduced as iterations progress. As described herein, such embeddings provide improved prediction of link selection, for example in a retail environment, and particularly for high-dimensionality data.

Figure 1:
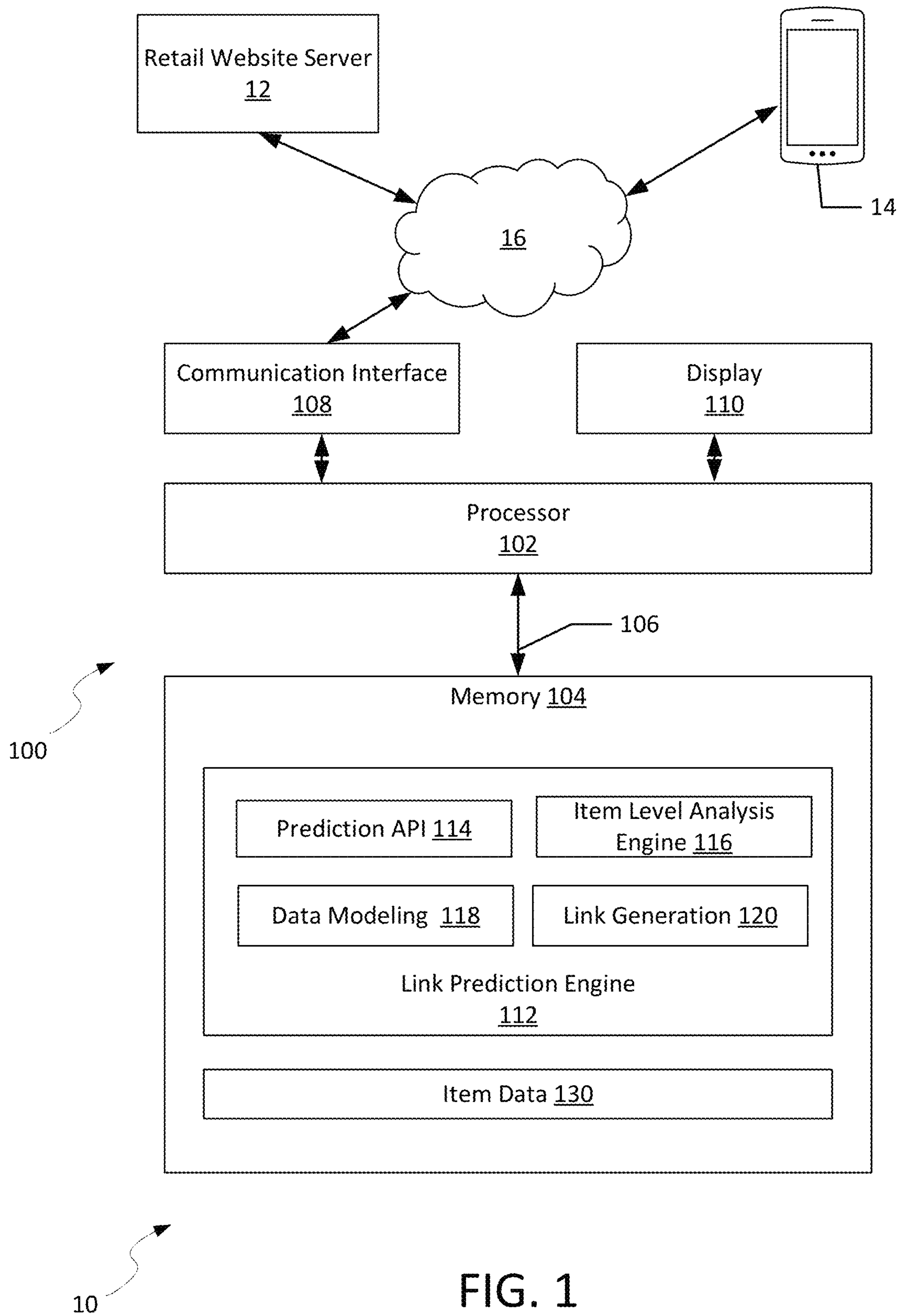
FIG. 1 illustrates a system for presenting items in an online environment, and in particular in a retail context, according to an example embodiment.

Referring to FIG. 1, a system 10 for presenting items in an online environment based on other item selections is shown, and in particular in a retail context, according to an example embodiment. The system includes a link prediction computing system 100, communicatively connected to a retail web server 12 and a user device 14 via network 16 (e.g., the Internet). The retail web server 12 presents items to a user device 14, which displays such items to the user via either a browser or application.

The link prediction computing system 100 includes a processor 102 communicatively connected to a memory 104 via a data bus 106. The processor 102 can be any of a variety of types of programmable circuits capable of executing computer-readable instructions to perform various tasks, such as mathematical and communication tasks.

The memory 104 can include any of a variety of memory devices, such as using various types of computer-readable or computer storage media. A computer storage medium or computer-readable medium may be any medium that can contain or store the program for use by or in connection with the instruction execution system, apparatus, or device. By way of example, computer storage media may include dynamic random access memory (DRAM) or variants thereof, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least one or more tangible media or devices. Computer storage media can, in some embodiments, include embodiments including entirely non-transitory components.

In the embodiment shown, the memory 104 stores a link prediction engine 112, discussed in further detail below. The computing system 100 can also include a communication interface 108 configured to receive and transmit data, for example to access data in an external database, or to provide such item recommendations to a retail web server 12 for presentation to a user device 14. Additionally, a display 110 can be used for viewing recommendation information generated by link prediction engine 112.

In various embodiments, the link prediction engine 112 includes a prediction Application Programming Interface (API) 114, an item level analysis engine 116, a data modeling component 118, and a link generation engine 120.

The Application Programming Interface (API) 114 is exposed to external systems and allows such systems to query, for a particular user, predicted items of interest that can be provided to that user. The API 114 can respond (e.g., via XML or similar markup language document) with a listing of a plurality of items in various formats, which indicate likely items to be recommended to a user in accordance with operation of the link prediction engine 112, as discussed below.

The item level analysis engine 116 analyzes data, such as item data 130, to determine relationships among items described by the item data in order to identify, for a given item or item type, other items to be recommended. This can include, for example, identifying items that are likely to be selected when an initial item is selected. This is described in more detail with regard to FIGS. 2-8 below. The item level analysis engine 116 may analyze not only item data, but historical data regarding which items are selected in association with each other (e.g., clickstream data, in the context of a retail website).

The data modeling component 118 can generate one or more data models from the item data. For example, the data modeling component 118 can generate a link prediction model based on item data and item selection data, such as the information generated by the item level analysis engine 116.

In example implementations, the data modeling component 118 is implemented using a Hebbian learning model. In particular, the data modeling component can apply an error-free associative learning update rule that models the embedding vector of a given node as a non-convex Gaussian mixture of the embeddings of the nodes in its immediate vicinity with some constant variance that is reduced as iterations progress. Details regarding such modeling are provided in connection with FIG. 2, with results from example modeling analyses discussed in connection with FIGS. 3-8.

In example implementations, a link generation engine 120 can receive item selections, (e.g., via the prediction API 14), and generate, based on the data modeling component 118, identifications of one or more links (e.g., links to other items within an item collection, or pages that may be of interest to the user) based on the model and the selected item.

The computing system 100 can provide the collection of predicted links to a retail web server 12, (e.g., for delivery to a user device 14) in response to a request from that device in association with an initial item selection.

Figure 2:
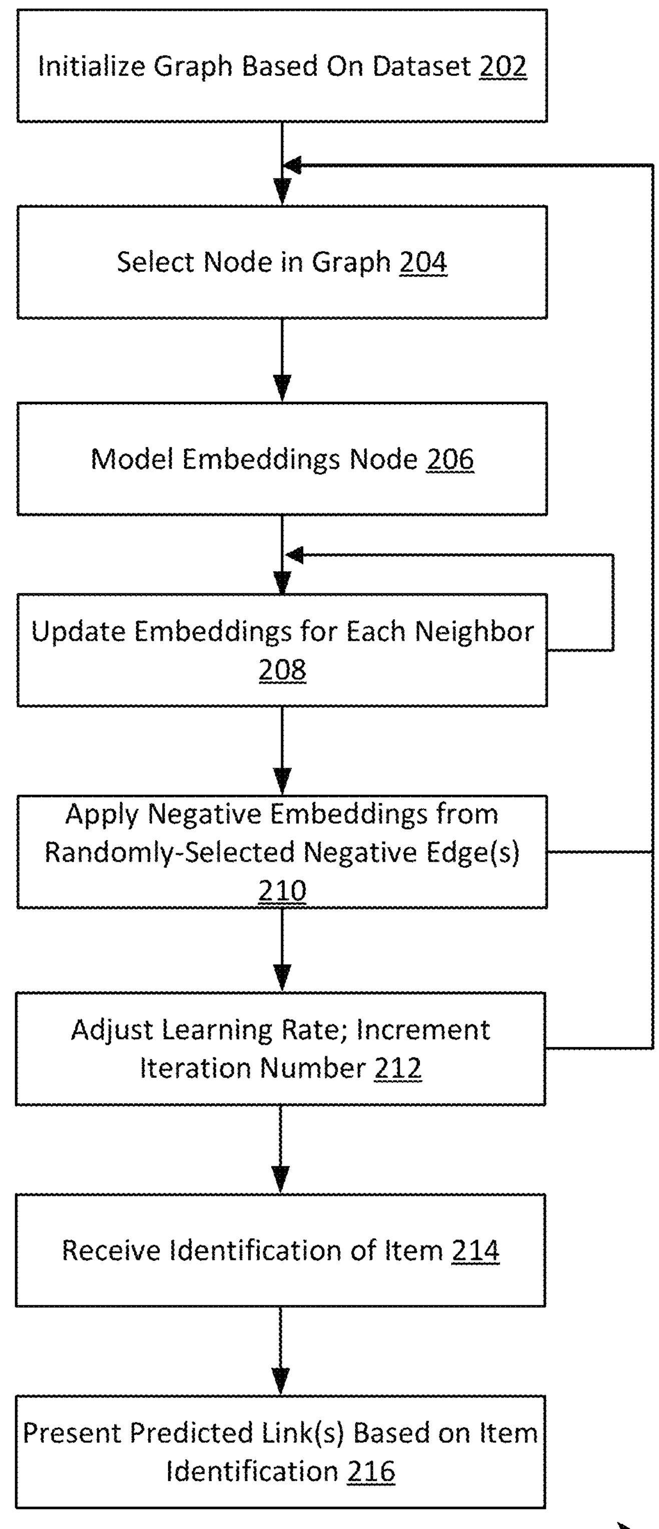
FIG. 2 illustrates a flowchart of a link prediction method for identifying and presenting possible links of interest to a particular population of users, according to an example implementation.

FIG. 2 illustrates a flowchart 200 of a method for presenting predicted links in an online environment based on previous item selections, according to an example embodiment. The method 200 can be performed using the system 10 of FIG. 1, above, and in particular the link prediction computing system 100. In particular, the method 200 can be used to identify links that may be of interest to a user given an initial link selection (e.g., items of likely interest based on a previously selected item).

In the embodiment shown, the method 200 includes initializing a graph based on a given training dataset (step 202). The training dataset can be, for example a set of items that are included in an item collection. The training dataset can also include, for example, historical item selection data, for example to illustrate which links or other items may be selected given an initial selection of a particular item or link. In accordance with the present disclosure, all embeddings are initialized (at step 202) to a multivariate normal distribution having a predetermined mean and variance. As illustrated in method 200, a Hebbian learning model is then applied in which, generally, a node is selected from the initialized graph (step 204), embeddings for that node are modeled (step 206), and embeddings are updated for each neighbor (step 208). In some instances, the method 200 further includes applying negative embeddings, for example from a randomly-selected negative edge (step 210). Such a methodology is performed for each node in the initialized graph, forming a trained model.

Once the above process is performed for each node in a graph, a variance may be adjusted by a predefined learning rate (step 212). Optionally, a counter may be incremented/decremented as well, which is set to a predetermined number of iterations. The process performed in steps 206-210 may then be repeated using that updated variance for the number of iterations that are specified.

Subsequently, an initial item may be selected (step 214). The initial item may be an item of an item collection offered by an item retailer, or some other initial link from which other links/items may be derived. The initial item may be selected, for example, by a user of a user device 14 based on items presented to that user by a retail web server 12. The retail web server 14 may then provide the identity of the item to computing system 100, and in particular, to link prediction engine 112. Based on that item, one or more predicted links may be provided to the retail web server 12 for display via the user device 14 (step 216). In example embodiments, the predicted links can include links to other items included in an item collection offered by a retailer, or other links that may be of interest to a user based on selection of an item. Those links may be displayed alongside the item that is presented to the user (e.g., on a product details page, or in a shopping cart page, or other page that may be presented to the user in response to item selection). Other possibilities for link prediction are possible as well.

In a specific example of application of a Hebbian learning model as discussed above, a Hebbian learning rule may be described using the following: $w_N = w_N + \eta * p_{RN}$. In this arrangement, $w_N$ is the parameter being updated, $\eta$ is the learning rate and $p_{RN}$ could be the strength of association (stronger if the two neurons frequently fire together) between parameters i and j. (or it could be a product of parameter i with the strength of association).

To initialize the training dataset (e.g., at step 202), a mean of 0 is selected, and variance represented as $\sigma^2$. Accordingly, parameter relationships may be initialized as $w_j \sim N(0, \sigma^2 I)$. The variance may be initialized at a particular value and updated to provide a simulated annealing effect (e.g., in which early iterations are weighted greater than later iterations). In some examples, the variance a may be initialized at a value of 10 and updated by dividing by 1.1 each iteration; however, in alternative embodiments, other values and annealing rates may be selected.

Once a node is selected (e.g., at step 204), embeddings at a given node are then modeled (at step 206) as a non-convex Gaussian mixture of the embeddings of connected nodes. For example, if there is an edge from node i to node j, the embedding of node j may be represented as: $w_j \sim N(w_i, \sigma^2 I)$.

The embedding of node j is updated (at step 208) for each connected edge as follows:

$$\tilde{w}_i \sim N(w_i, \sigma^2 I)$$

$$\delta_j = \sum_i (\tilde{w}_i * p_{ij} * \eta)$$

$$w_j = w_j + \delta_j$$

The $\delta_j$ are then added to the embedding at node j, where there is an edge from node i to node j. In the above, $p_{ij}$ is the transition probability, and $\eta$ is the learning rate. The graph is weighted, asymmetric, and undirected.

In some embodiments, as noted above, negative embeddings may be embedded by randomly selecting a negative edge at each node, and propagating the negative embeddings to both selected nodes (e.g., the current node j and the randomly selected node i for which no edge exists). This can be performed with a fixed transition probability. In some embodiments, a transition probability of 0.5 is selected; however, other transition probabilities may be used.

Upon completion of the above sequence for each connected node to the given node (and one or more negative edges), the process may continue for each of the other nodes in the graph. This iterative procedure learns the embeddings of all nodes in the graph.

Furthermore, upon completion of the process for each node, a predetermined learning rate $\tau$ may be used to update the variance $\sigma^2$, e.g.: $\sigma^2 \leftarrow \sigma^2/\tau$. Accordingly, the process of steps 204-210 may be repeated using that updated variance. This can be performed for a predetermined number of iterations (e.g., 10 iterations using the 1.1 learning rate identified above, which were established in step 202).

In example embodiments, and in accordance with the embeddings for each node, a predictive set of related nodes may be generated using the above steps 202-210. For example, a top predetermined number of predicted related nodes may be generated. For example, a top 2-10 links may be provided for selection based on previous link selections; some or all of the provided links may be presented to the user by the retail web server 12. The predicted set of related nodes may be used, for example, to perform link prediction, as described in conjunction with steps 214-216.

A detailed example of the algorithm performed in steps 204-212 is illustrated below in Table 1:

TABLE 1

| Example Hebbian Graph Embeddings Algorithm Implementation |
| --- |
| 1: procedure FINDEMBEDDINGS(G) |
| 2: Inputs: Weighted, asymmetric and undirected graph with nodes as nodes |

TABLE 1-continued

| Example Hebbian Graph Embeddings Algorithm Implementation |
|---|
| (1, 2 . . ., P) and edge weights as transition probabilities between nodes $p_{ij}$ |
| 3: Hyper-parameters: |
| 4: $\sigma^2$ Variance of normal distribution (initial value = 10) |
| 5: N Number of iterations of Hebbian learning |
| 6: K Dimensionality of node representation |
| 7: $\tau$ Variance reduction factor (value = 1.1) |
| 8: Initialization: Initialize the nodes representation $w_i$ by sampling from a zero mean multivariate normal distribution $N(0, \sigma^2 I)$ of dimensionality K |
| 9: for each integer m in N do |
| 10: for each node i in P do |
| 11: for each node j in Adj(i) do |
| $\tilde{w}_i \sim N(w_i, \sigma^2 I)$ (6) |
| $w_j \leftarrow w_j + \eta \tilde{w}_i p_{ij}$ (7) |
| 12: end for |
| 13: end for |
| $\sigma^2 \leftarrow \sigma^2/\tau$ (8) |
| 14: end for |
| 15: end procedure |

Figure 3:
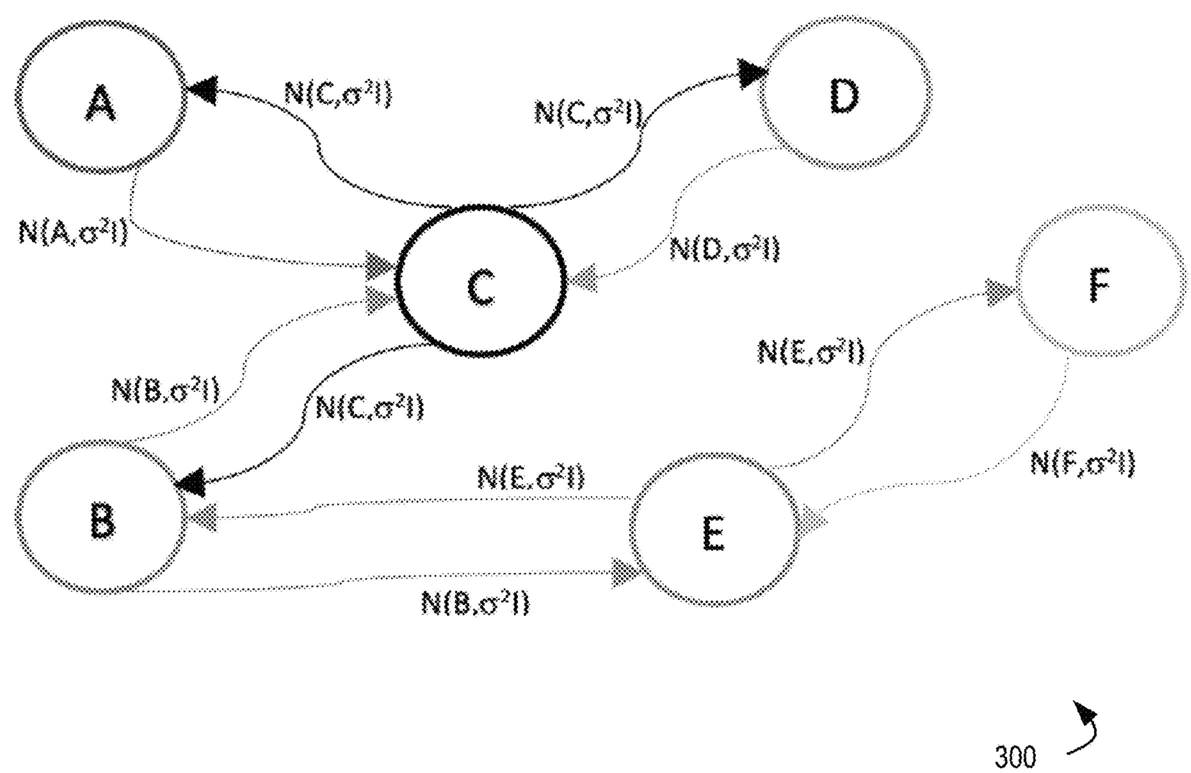
FIG. 3 illustrates a graph showing a set of nodes and respective graph embeddings, in an example graphical depiction of the graph embeddings accomplished using the Hebbian processes described herein.
Figure 7:
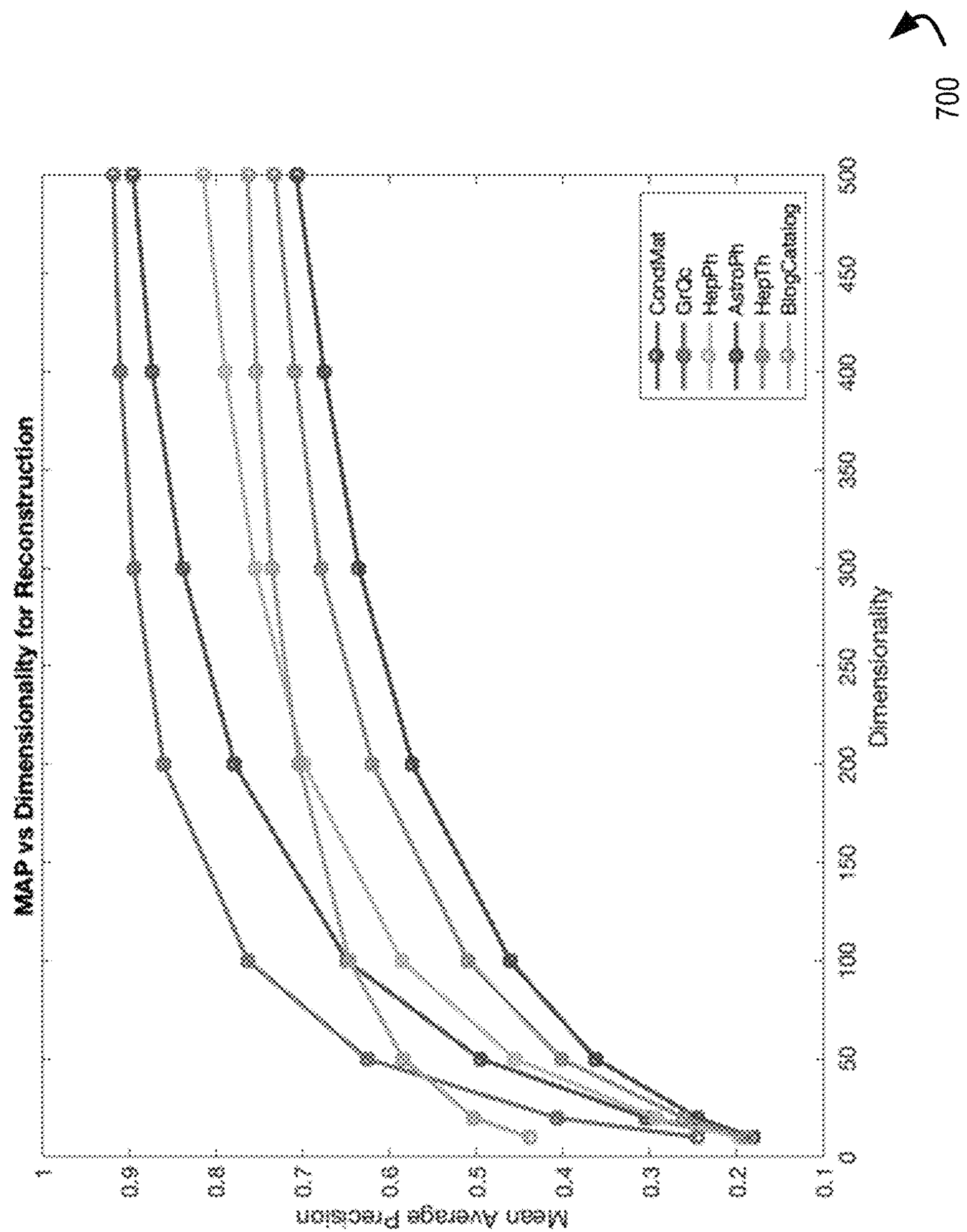
FIG. 7 is a graph shown reconstruction results utilizing Hebbian graph embeddings, e.g., as illustrated in FIG. 5.

Referring to FIG. 3, an example graph 300 is shown that illustrates propagation of embeddings across a graph of interconnected nodes. In the example shown, each of a set of nodes A-F have defined interconnections. The edges between the nodes may be aggregated across each iteration based on all of the iterations that have occurred. For example, the edges between nodes A and C, shown as $N(A, \sigma^2 I)$, and $N(C, \sigma^2 I)$, respectively, represent all iterations of embeddings across the iterations.

Referring now to FIGS. 4-9, results from such a Hebbian learning approach are illustrated on a sample dataset, as well as for a particular retailer example. In FIG. 4, a table 400 illustrates results of performing the methodology described above in connection with FIG. 2 on three different sets of publically-available link prediction test data (denoted as AstroPh, BlogCatalog, and HepTh). In particular, a mean average precision (MAP) is obtained across data having similar dimensionality. It is seen that for algorithms used with similar dimensionality, the Hebbian approach described herein has significantly improved results over, e.g., node2vec, graph factorization (GF), Structural Deep Network Embedding (SDNE), Laplacian Eigenmaps (LE), and High-Order Proximity-preserved Embedding (HOPE), as reflected in significantly higher MAP.

As is seen in the chart 500 of FIG. 5, a mean average precision is determined for a graph reconstruction process across the datasets used in FIG. 4. In this example, as dimensionality increases, the mean average precision of the Hebbian graph embeddings process utilized herein shows further improvement. In particular, in the chart 500, as dimensionality increases (from 10, to 20, to 50, to 100, to 200, and up to 500 dimensions), mean average precision using the above Hebbian graph embeddings approach continues to increase. Such an arrangement is plotted in the graph 700 of FIG. 7, which shows that although for all datasets the initial MAP may differ and the rate of improvement is different, there is continued improvement with higher dimensionality (tapering off to less drastic increases in MAP at higher-order dimensionality (e.g., of dimensionality 300-500).

In FIG. 6, a chart 600 is illustrated showing results of the same reconstruction process illustrated in the results of FIG. 5, but in an "untrained" example. In particular, in this example, an entire original graph is attempted to be reconstructed without splitting the dataset into training and testing components. Each node's connecting edges (positives) are ranked against all other nodes in the graph while computing a mean average precision in parallel. For example, a node having two edges, with 10,000 nodes in a graph, has a 2:9998 positive to negative ratio. In the examples shown, 10 iterations are used, with a learning rate of 1.0.

As can be seen in comparison of the dataset to the MAP seen in FIG. 5, it can be see that training using the Hebbian approach presents significant benefits.

Referring now to FIG. 8, an example of the Hebbian graph embeddings approach is provided as applied to a retailer dataset, and in particular, as applied within a recommender system used by an online retailer. This is a specific example of a high dimensionality problem in which the Hebbian graph embeddings solution may be utilized with advantageous results.

In particular, in the context of link prediction, there are many possible directions a user may take (different links that may be selected) given an initial link selection. This is particularly true in a retail context, in which a user selection of an initial item may result in a user subsequently selecting any of a large number of different items. Accordingly, as seen in chart 800 of FIG. 8, a sample dataset of 12.5 million users and 200,000 items (in this example, clothing items) were selected as a population for training and measurement. Of those users, 2.5 million were reserved for testing, with the remainder used for training. Accordingly, the graph representation is initialized with 200,000 nodes, and approximately 13.1 billion edges. Notably, the weight of an incoming edge might be different from an outgoing edge between any two nodes.

In the chart 800 of FIG. 8, performance is assessed based on hit rate for a link that is presented to a user. The top 10 recommendations are generated per item based on nearest neighbors of the generated embeddings, based on an inner product across all 200,000 items. One random item from the user's entire interaction history is selected, and recommendations for that random item is computed; if any of the top 10 recommended items also occurs in the interaction history, the result is considered a hit (otherwise, the result is a fail, since a presented "top ten" item would be presumed not selected).

The average hit rate of 24.2% is seen in chart 800 of FIG. 8, and represents the total number of successes divided by a number of users, at a dimensionality level of 100. As can be seen, as dimensionality increases from 100 to 200 and 250 (leaving the number of iterations, the learning rate, and the dataset constant), the hit rate for items in the top 10 recommendations increases to 30.1% and 31.1%, respectively.

In example embodiments in which the method 200 is performed on computing systems such as described above in connection with FIG. 1, the method may be parallelized. In some example implementations, such computing systems may implement the methodology using Apache Spark. Additionally, although a specific learning rate is applied in these experiments as discussed above on connection with FIG. 2, other learning rates may be used without significant change to results (although a small learning rate may require more iterations).

As seen in FIG. 9, a further comparative chart 900 is provided illustrating a comparison of mean average precision (MAP) between the Hebbian graph embeddings process described herein and existing graph embeddings approaches. As compared to chart 400 of FIG. 4 (which related to graph reconstruction prevision), chart 900 relates to use of Hebbian graph embeddings for link prediction.

As seen in the chart 900, the Hebbian approach shows significant improvements in MAP as compared to all other graph embeddings approaches considered as in FIG. 4, namely node2vec, graph factorization (GF), Structural Deep Network Embedding (SDNE), Laplacian Eigenmaps (LE), and High-Order Proximity-preserved Embedding (HOPE). This is the case despite similar (although somewhat lower) dimensionality being applied.

Accordingly, it can be seen that the methods and systems described herein provide improved performance relative to both untrained systems and relative to existing graph embeddings approaches in both a graph reconstruction context, as well as in a link prediction context.

Figure 10:
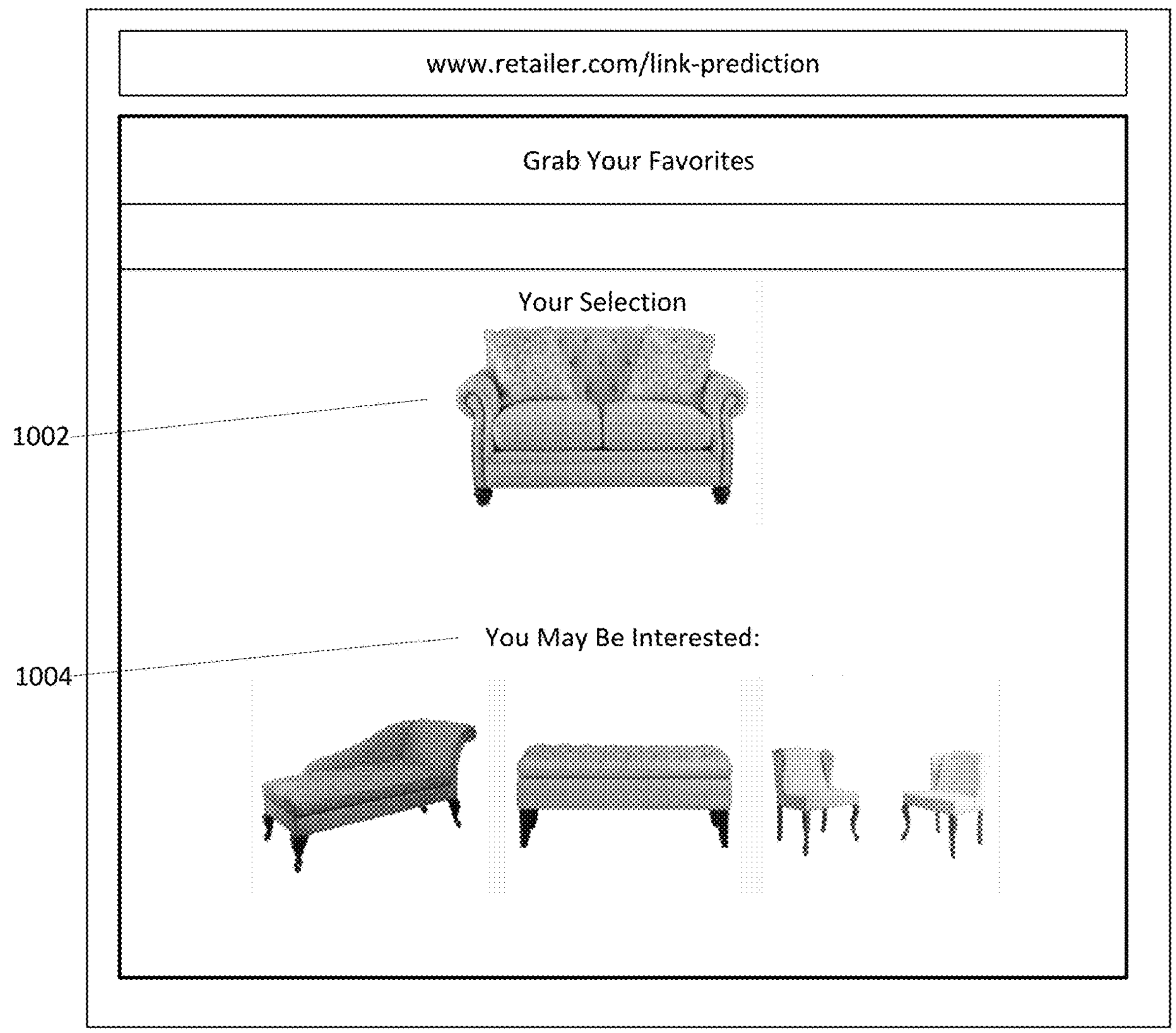
FIG. 10 illustrates a retailer interface useable for providing item recommendations, according to an example implementation.

FIG. 10 illustrates a retailer interface 1000 useable for providing item recommendations, according to an example implementation. The retailer interface 1000 can be presented within a retailer website, such as may be provided by a retail web server 12 as noted above. The retailer interface 1000 can be presented to a user a set of links to possible items of interest, (e.g., based on a user selection of a particular item). As seen in the example, a selection of items 1004 can be presented to a user based on information returned to the retail web server 12 from the API 114 of system 100, in response to user selection of item 1002 (e.g., based on a determination using the Hebbian graph embeddings discussed above). The specific items presented will change according to which item is selected by the user, as noted above.

Figure 11:
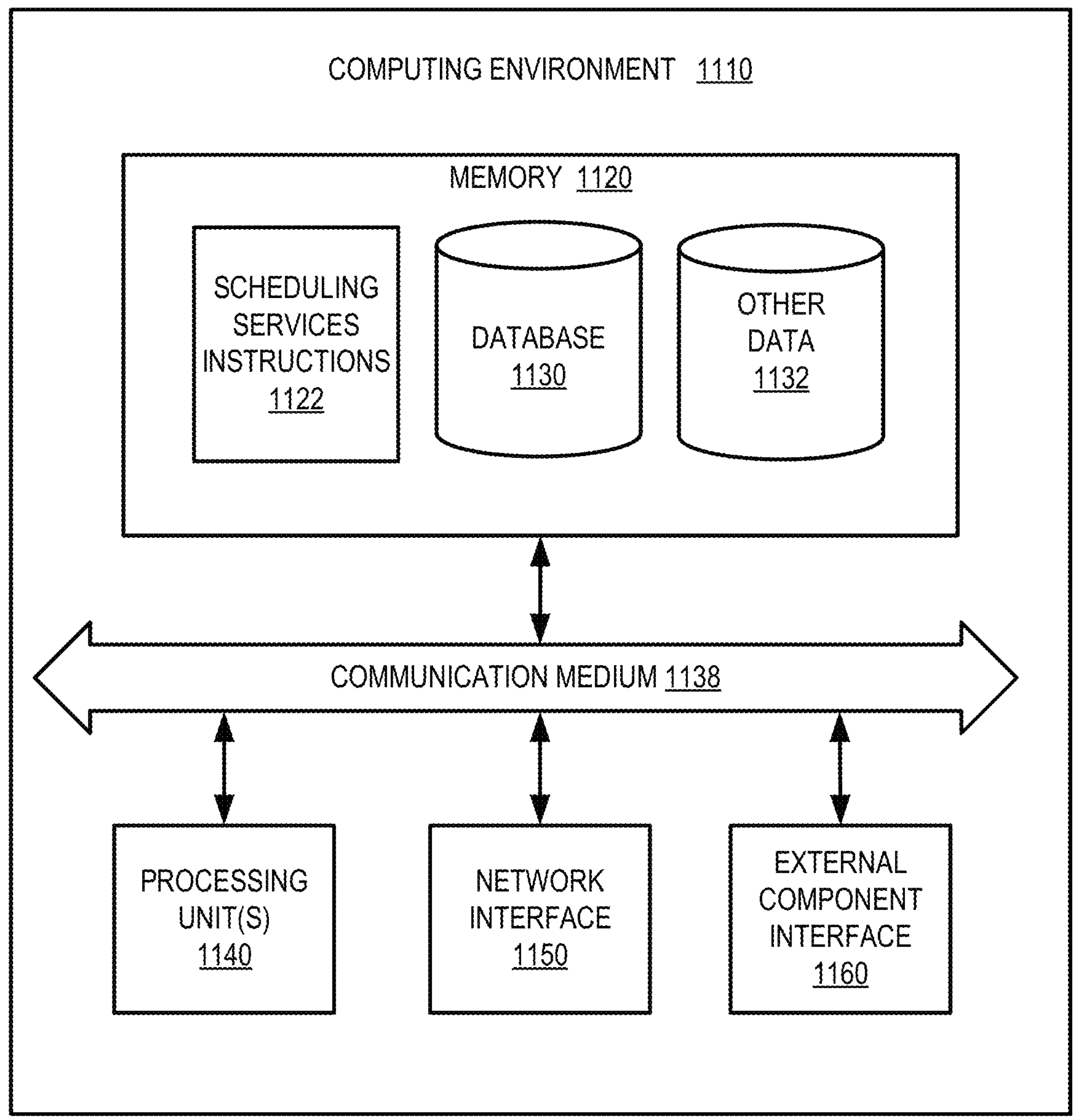
FIG. 11 is a block diagram of a computing system useable to implement aspects of the present disclosure.

FIG. 11 illustrates an example system 1100 with which disclosed systems and methods can be used. In an example, the system 1100 can include a computing environment 1110. The computing environment 1110 can be a physical computing environment, a virtualized computing environment, or a combination thereof. The computing environment 1110 can include memory 1120, a communication medium 1138, one or more processing units 1140, a network interface 1150, and an external component interface 1160.

The memory 1120 can include a computer readable storage medium. The computer storage medium can be a device or article of manufacture that stores data and/or computer-executable instructions. The memory 1120 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 1120 can store various types of data and software. For example, as illustrated, the memory 1120 includes scheduling services instructions 1122 for implementing one or more aspects of the scheduling services described herein, database 1130, as well as other data 1132. In some examples the memory 1120 can include instructions for generating a website and/or maintaining product information).

The communication medium 1138 can facilitate communication among the components of the computing environment 1110. In an example, the communication medium 1138 can facilitate communication among the memory 1120, the one or more processing units 1140, the network interface 1150, and the external component interface 1160. The communications medium 1138 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 1140 can include physical or virtual units that selectively execute software instructions. In an example, the one or more processing units 1140 can be physical products comprising one or more integrated circuits. The one or more processing units 1140 can be implemented as one or more processing cores. In another example, one or more processing units 1140 are implemented as one or more separate microprocessors. In yet another example embodiment, the one or more processing units 1140 can include an application-specific integrated circuit (ASIC) that provides specific functionality. In yet another example, the one or more processing units 640 provide specific functionality by using an ASIC and by executing computer-executable instructions.

The network interface 1150 enables the computing environment 1110 to send and receive data from a communication network (e.g., network 16). The network interface 1150 can be implemented as an Ethernet interface, a token-ring network interface, a fiber optic network interface, a wireless network interface (e.g., WI-FI), or another type of network interface.

The external component interface 1160 enables the computing environment 1110 to communicate with external devices. For example, the external component interface 1160 can be a USB interface, Thunderbolt interface, a Lightning interface, a serial port interface, a parallel port interface, a PS/2 interface, and/or another type of interface that enables the computing environment 1110 to communicate with external devices. In various embodiments, the external component interface 1160 enables the computing environment 1110 to communicate with various external components, such as external storage devices, input devices, speakers, modems, media player docks, other computing devices, scanners, digital cameras, and fingerprint readers.

Although illustrated as being components of a single computing environment 1110, the components of the computing environment 1110 can be spread across multiple computing environments 1110. For example, one or more of instructions or data stored on the memory 1120 may be stored partially or entirely in a separate computing environment 1110 that is accessed over a network.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A method comprising:

initializing a graph including a plurality of nodes representing selections of items in a training dataset to a multivariate normal distribution having a predetermined mean and a predetermined initial variance, the items in the training dataset comprising items in an item collection;

for each node in the graph, modeling embeddings for the node as a non-convex Gaussian mixture of embeddings of each neighboring node having a shared edge with the node, the embeddings being updated based at least in part on a transition probability and a variance;

updating the embeddings for each node over a predetermined number of iterations, each iteration including an updated variance based on a learning rate; and based on receipt of an identification of an item from among the item collection, identifying a plurality of predicted selections of items using the embeddings for a node corresponding to the item.

2. The method of claim 1, further comprising, for each node in the graph, applying negative embeddings to the node based on a randomly-selected negative edge, the negative embeddings being applied with a predetermined transition probability.

3. The method of claim 1, wherein the mean is predetermined to be 0, and the predetermined initial variance is set to a predetermined amount.

4. The method of claim 1, wherein the learning rate comprises a predetermined learning rate.

5. The method of claim 1, wherein iteratively updating the embeddings for each node is performed using the equation: $\delta_N = \aleph(i, \sigma I) * p_{RN} * \eta$, wherein $\delta_N$ represents updates to the embeddings added to the existing embedding at node j, where there is an edge from node i to node j, $p_{RN}$ is the transition probability, and $\eta$ is the learning rate.

6. The method of claim 1, wherein the item collection comprises a collection of retail items offered for sale by an online retailer.

7. The method of claim 1, wherein the plurality of predicted selections of items comprise items predicted to be selected by a user based on the user selecting the identified item.

8. The method of claim 1, wherein the learning rate adjusts, for each iteration of a plurality of iterations, the predetermined initial variance.

9. An online link prediction system comprising:

a processor;

a memory operatively connected to the processor, the memory storing instructions which, when executed by the processor, cause the system to perform:

initializing a graph including a plurality of nodes representing selections of items in a training dataset to a multivariate normal distribution having a predetermined mean and a predetermined variance, the items in the training dataset comprising items in an item collection; and for each node in the graph, modeling embeddings for the node as a non-convex Gaussian mixture of embeddings of each neighboring node having a shared edge with the node, the embeddings being updated based at least in part on a transition probability and a variance;

updating the embeddings for each node over a predetermined number of iterations, each iteration including an updated variance based on a learning rate; and based on receipt of an identification of an item from among the item collection, identifying a plurality of predicted selections of items using the embeddings for a node corresponding to the item.

10. The online link prediction system of claim 9, wherein the online link prediction system is communicatively connected to a retail web server and a retailer item database storing the item collection.

11. The online link prediction system of claim 10, wherein the plurality of predicted selections of items includes a top ten ranked list of predicted items.

12. The online link prediction system of claim 10, wherein the instructions cause the system to transmit the plurality of predicted selections of items to a retail web server for inclusion in a retail webpage to be displayed to a user.

13. The online link prediction system of claim 10, wherein the identification of the item is based on a user selection of an item presented to the user via the retail web server.

14. The online link prediction system of claim 9, wherein the instructions cause the process to, for each node in the graph, apply negative embeddings to the node based on a randomly-selected negative edge, the negative embeddings being applied with a predetermined transition probability.

15. The online link prediction system of claim 14, wherein the negative embeddings are further applied to a corresponding node related to each ode according to the randomly-selected negative edge.

16. The online link prediction system of claim 14, wherein a plurality of negative embeddings are applied to each node based on a corresponding plurality of randomly-selected negative edges.

17. A system comprising:

a retail web server; and an online link prediction system communicatively coupled to the retail web server, the online link prediction system including a processor and a memory operatively coupled to the processor, the memory storing instructions which, when executed, cause the online link prediction system to:

initialize a graph including a plurality of nodes representing selections of items in a training dataset to a multivariate normal distribution having a predetermined mean and a predetermined variance, the items in the training dataset comprising items in an item collection; and for each node in the graph, model embeddings for the node as a non-convex Gaussian mixture of embeddings of each neighboring node having a shared edge with the node, the embeddings being updated based at least in part on a transition probability and a variance;

update the embeddings for each node over a predetermined number of iterations, each iteration including an updated variance based on a learning rate; and based on receipt of an identification of an item from among the item collection, identify a plurality of predicted selections of items using the embeddings for a node corresponding to the item.

18. The system of claim 17, wherein the retail web server is configured to host a retail website including the item collection, the retail web server being accessible from a user device.

19. The system of claim 17, wherein iteratively updating the embeddings for each node is performed using the equation: $\delta_N = \aleph(i, \sigma I)^* p_{RN}^* \eta$, wherein $\delta_N$ represents updates to the embeddings added to the existing embedding at node j, where there is an edge from node i to node j, $p_{RN}$ is the transition probability, and $\eta$ is the learning rate.

20. The system of claim 19, wherein updating the embeddings for the node includes applying negative embeddings to the node based on a randomly-selected negative edge, the negative embeddings being applied with a predetermined transition probability.

* * * * *